Patented Jan. 20, 1942

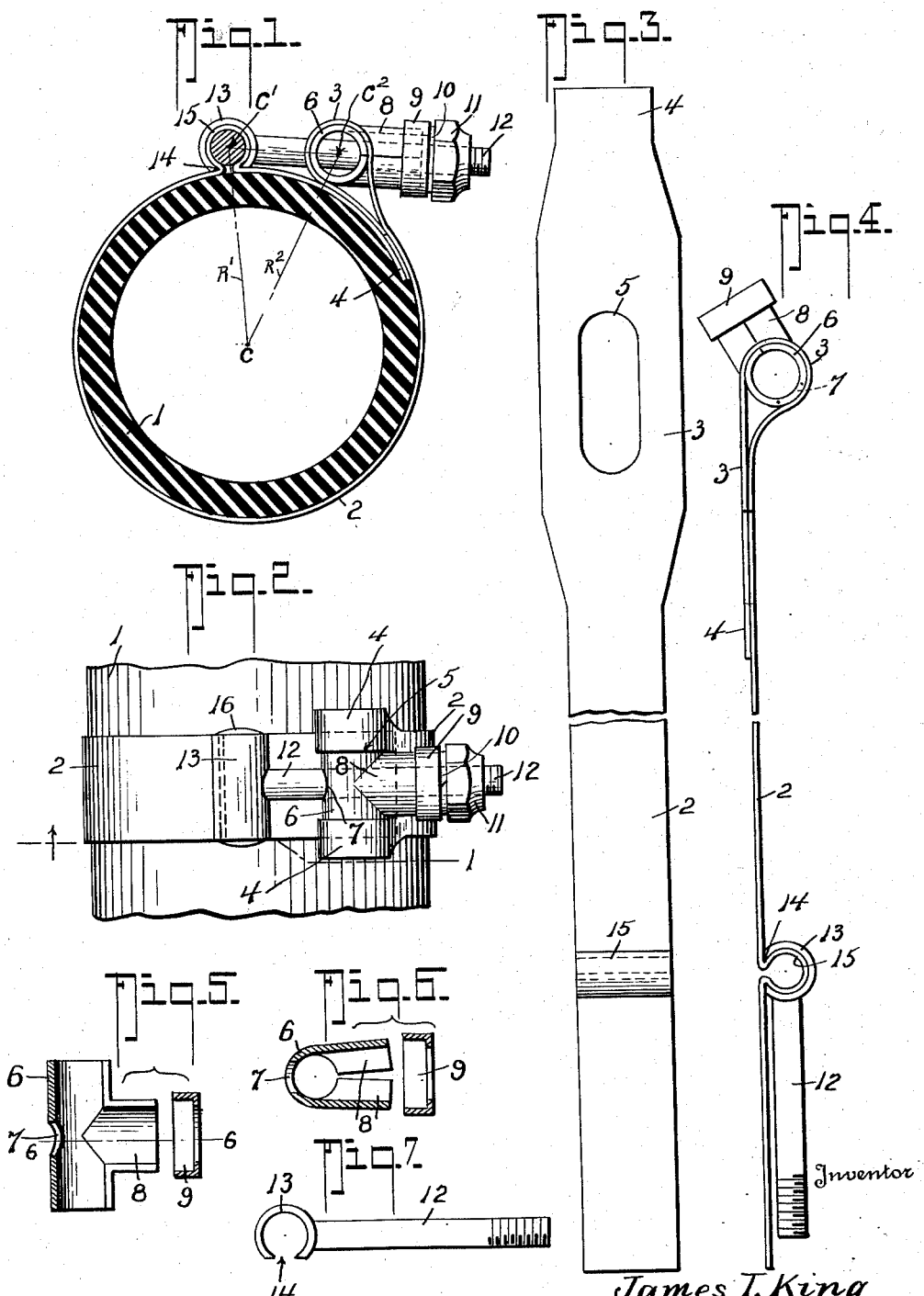

2,270,375

UNITED STATES PATENT OFFICE 2,270,375

HOSE CLAMP

James T. King, Burbank, Calif.

Application August 6, 1941, Serial No. 405,722

8 Claims. (Cl. 24—19)

My invention relates to the art of hose clamps and it particularly has for its objects to provide a clamp which is light in weight, possesses great strength, is made of such materials and is so constructed as to meet all standards of the S. A. E., a clamp which can be assembled on the hose after the hose is in place, a clamp that does not have to be pre-loaded to give the necessary tension to secure the flexible rubber hose connection from leaks of fuels under high pressures, a clamp which will stay tensioned under the application of external or internal heat, a clamp that is rust and weather proof and is specifically adapted for installation on aircraft, marine engines, and a clamp that can be safely used after removal from the original installation.

Another object is to provide a clamp that is full fitting, i. e., it extends and applies its pressures around the entire circumference of the hose.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which—

Fig. 1 is a cross section on approximately the line 1—1 in Fig. 2.

Fig. 2 is a plan view of the invention as shown in Fig. 1.

Fig. 3 is a plan view of the flexible steel band shown in Figs. 1 and 2, a part being broken out.

Fig. 4 is a side elevation, a part being broken out, showing the clamp assembly ready for use.

Fig. 5 is a central section of one of the trunnion elements and its cap separated.

Fig. 6 shows the same in section on the line 6—6 of Fig. 5.

Fig. 7 is a side elevation of the draw bolt.

In the drawing like numbers of reference indicate like parts in all figures.

A band of steel (preferably rustless, flexible sheet steel) is provided to encircle the flexible hose 1. This band comprises a short wide portion 3, a long narrow portion 2, and a short narrow portion 4. The longer portion 2, at a predetermined place clockwise from the portion 3 (depending on the diameter or size of the hose to be clamped), is looped as at 15 to receive the tubular head 13 of the draw bolt 12, which head has an opening or slot 14 so that in assembling the parts the head 13 is slipped endwise or sidewise over the loop 15, after which a rivet 16 is inserted in the loop (Figs. 1 and 2) to keep it from collapsing.

The band portion 3 is slotted as at 5 to receive the bolt guide portion of the trunnion element. This element, in my preferred construction shown, is formed by one piece of metal, stamped or otherwise shaped to provide the trunnion proper 6 and the guide 8. The trunnion proper 6 and guide are split, and the split is held closed by a cap 9 forced over the end of the guide 8, the cap being held in place by retaining friction. The trunnion element has a hole 7 in alignment with the guide 8, through which the draw bolt 12 passes when the clamp is in place on a hose.

In assembling the clamp parts, the guide 8 is passed through slot 5 and the portion 3 of the band is bent around the trunnion 6 with the end 4 on the under side of the band. The draw bolt is then located on the portion 2 of the band (Fig. 4). This assembly is then bent around the hose 1 and bolt 12 is passed through hole 7 and guide 8, and a washer 10 and nut 11 are placed on the bolt to abut the cap 9. The free end of the band is passed under the portion 3 of the band (Fig. 1) before nut 11 is tightened.

Upon tightening the nut 11, the band or strap is drawn taut about the hose, applying a uniform squeeze over the full periphery (360°) of the hose 1.

It will be seen by reference to Fig. 1 of the drawing that the trunnion 6 is of greater diameter than that of the split head 13 of the draw bolt. Therefore its axis at $C^2$ is farther from the center C of the hose along a radius $R^2$ than is the axis at $C^1$ along a radius $R^1$. Hence when the nut 11 is tightened the draw is along a line $C^1$—$C^2$ which is not parallel to a tangent to the circumference of the hose, but lies at an inclination thereto. As the head 13 has a slight pivotal movement on the loop 15, bolt 12 not only acts as a draw bolt but also somewhat as a lever. As nut 11 is tightened and axes $C^1$—$C^2$ approach each other, bolt 12 goes through a slight counter-clockwise movement on axis $C^1$, thus permitting the band or strap at the trunnion to slide easily over the free end without forcing that end to plow into the surface of the rubber, as is sometimes the case with those clamps of similar structure but where the draw is parallel to a tangent to the circumference of the hose.

With my construction of clamp the tension is applied through an arc of from 60° to 45°, which is why my clamp does not have to be pre-loaded. The circle of the clamp closes about one-thirty-second of an inch for each complete turn of the nut 11. When tension is being applied the clamp does not stop with sudden and abrupt stoppage, as the free floating trunnion rotates in the strap of the clamp to position itself to the new alignment caused by the decreased circumference of the clamp as maximum tension is applied by the nut 11 and the bolt 12.

It will be seen from the foregoing that the flexibility of the strap is retained over the entire circumference of the hose, a thing that is not accomplished by those prior art structures where the bolt is fixed to the strap end.

By allowing sufficient take-up in the design of the clamp it will eliminate the need to stock many various sized clamps, as is now the practice with present approved hose clamps. The extremely limited take-up of other hose clamps now requires a specifically dimensioned hose clamp to fit each size of rubber hose, which increase, for diameter measurements, in one-eighth of an inch increments.

The construction shown and described herein is particularly adapted to use on supercharged aircraft engines where increased fuel and oil pressures require greater reliability and security for all accessories now being used.

From the foregoing description, taken in connection with the accompanying drawing, it is thought that the construction, operation and advantages of the invention will be clear to those skilled in the art to which it relates.

What I claim is:

1. In a hose clamp, a flexible sheet-metal strap having a slot near one end, a bolt guide and trunnion member the guide portion of which projects through said slot when the strap and trunnion member are assembled with the strap at the sides of the slot looped around the trunnion of said trunnion member, said strap having a loop portion at a predetermined place located between the ends of the strap, a draw bolt having a tubular head fitted on said loop portion and constructed to pass through said bolt guide and trunnion member, and a nut on said bolt.

2. In a hose clamp, a flexible sheet-metal strap having a slot near one end, a bolt guide and trunnion member the guide portion of which projects through said slot when the strap and trunnion member are assembled with the strap at the sides of the slot looped around the trunnion of said trunnion member, said strap having a loop portion at a predetermined place located between the ends of the strap, a draw bolt having a tubular head fitted on said loop portion and constructed to pass through said bolt guide and trunnion member, and a nut on said bolt, the diameter of the strap loop about the trunnion being greater than the diameter of said loop portion, by virtue of which the axis of the trunnion will lie a greater distance from the center of the hose to be clamped than does the axis of said loop portion, so that said draw bolt will lie out of parallellism with a tangent to the circumference of the hose.

3. In a hose clamp, a flexible sheet-metal strap having a slot near one end, a bolt guide and trunnion member the guide portion of which projects through said slot when the strap and trunnion member are assembled with the strap at the sides of the slot looped around the trunnion of said trunnion member, said strap having a loop portion at a predetermined place located between the ends of the strap, a draw bolt having a tubular head fitted on said loop portion and constructed to pass through said bolt guide and trunnion member, a nut on said bolt, the head of said draw bolt being slotted, and a filler element located in said loop portion.

4. In a hose clamp, a flexible sheet-metal strap having a slot near one end, a bolt guide and trunnion member the guide portion of which projects through said slot when the strap and trunnion member are assembled with the strap at the sides of the slot looped around the trunnion of said trunnion member, said strap having a loop portion at a predetermined place located between the ends of the strap, a draw bolt having a tubular head fitted on said loop portion and constructed to pass through said bolt guide and trunnion member, a nut on said bolt, the diameter of the strap loop about the trunnion being greater than the diameter of said loop portion, by virtue of which the axis of the trunnion will lie a greater distance from the center of the hose to be clamped than does the axis of said loop portion, so that said draw bolt will lie out of parallellism with a tangent to the circumference of the hose, the head of said draw bolt being slotted, and a filler element located in said loop portion.

5. In a hose clamp, a flexible sheet-metal strap having a slot near one end, a bolt guide and trunnion member the guide portion of which projects through said slot when the strap and trunnion member are assembled with the strap at the sides of the slot looped around the trunnion of said trunnion member, said strap having a loop portion at a predetermined place located between the ends of the strap, a draw bolt having a tubular head fitted on said loop portion and constructed to pass through said bolt guide and trunnion member, a nut on said bolt, and a rivet in said loop portion.

6. In a hose clamp, a flexible sheet-metal strap having a slot near one end, a bolt guide and trunnion member the guide portion of which projects through said slot when the strap and trunnion member are assembled with the strap at the sides of the slot looped around the trunnion of said trunnion member, said strap having a loop portion at a predetermined place located between the ends of the strap, a draw bolt having a tubular head fitted on said loop portion and constructed to pass through said bolt guide and trunnion member, a nut on said bolt, the diameter of the strap loop about the trunnion being greater than the diameter of said loop portion, by virtue of which the axis of the trunnion will lie a greater distance from the center of the hose to be clamped than does the axis of said loop portion, so that said draw bolt will lie out of parallellism with a tangent to the circumference of the hose, and a rivet in said loop portion.

7. In a hose clamp wherein is provided a strap and a bolt guide and trunnion member, said trunnion member comprising an integral body having a tubular trunnion portion and a tubular guide portion, said tubular guide portion and the adjacent side of said tubular trunnion portion being split, and a cap fitted over the end of said guide portion to hold the split portions closed together, said cap and the unsplit side of said trunnion portion having aligning bolt holes.

8. A hose clamp comprising, a strap of flexible metal having a slot adjacent one end, a trunnion member of tubular structure and embodying a trunnion portion and a bolt guide portion at right angles to each other, said bolt guide portion projecting through said slot with the strap encircling the trunnion portion, a draw bolt and nut cooperating with said trunnion member, and means adjustably-detachably anchoring said bolt to said strap, by virtue of which the axis of the anchorage will be intersected by the axis of the bolt and will lie at a lesser distance from the axis of the hose than does the axis of said trunnion which is also intersected by the axis of said bolt.

JAMES T. KING.